No. 808,819. PATENTED JAN. 2, 1906.
C. E. DE MOSS.
TRACKING DEVICE FOR SLAUGHTER HOUSE TRAVELERS.
APPLICATION FILED APR. 25, 1905.
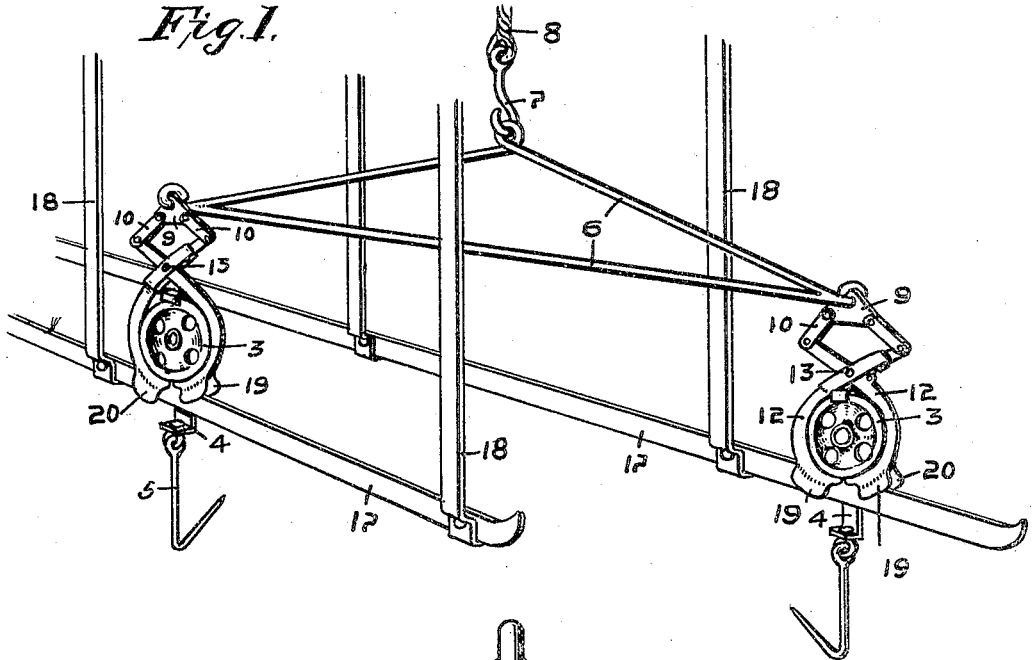
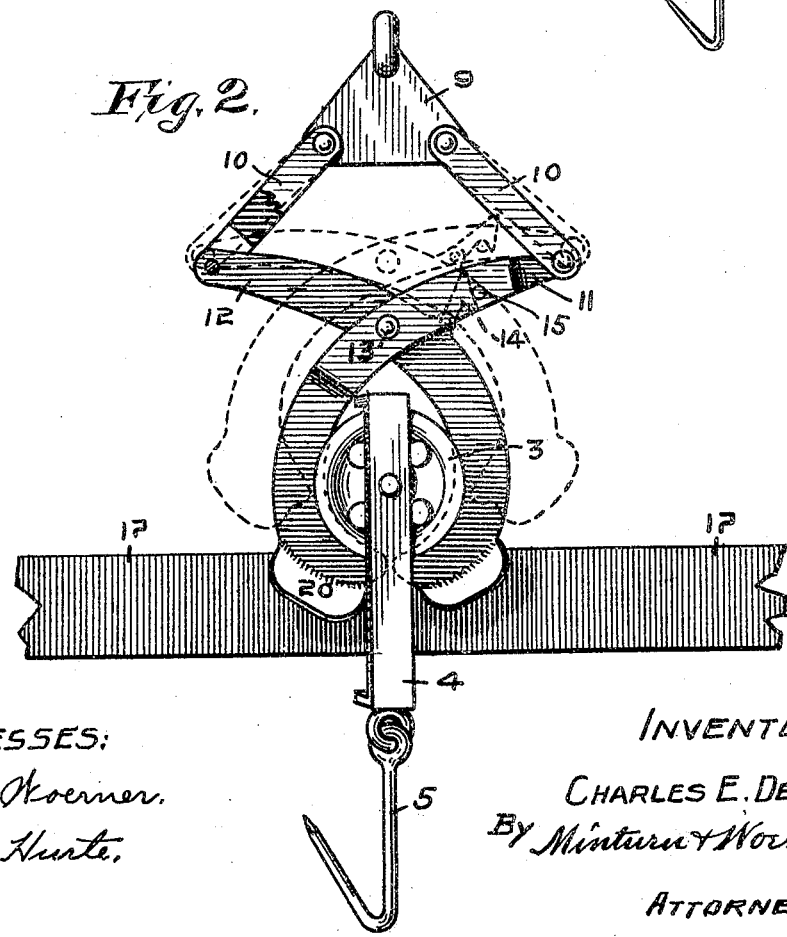
WITNESSES:
L. B. Koerner.
W<sup>m</sup> Hunte.
INVENTOR.
CHARLES E. DE MOSS,
By Minturn & Woerner,
ATTORNEYS.

UNITED STATES PATENT OFFICE.

CHARLES E. DE MOSS, OF INDIANAPOLIS, INDIANA, ASSIGNOR OF ONE-HALF TO ELIHU F. BARKER, OF FRANKLIN, INDIANA.

TRACKING DEVICE FOR SLAUGHTER-HOUSE TRAVELERS.

No. 808,819.        Specification of Letters Patent.        Patented Jan. 2, 1906.

Application filed April 25, 1905. Serial No. 257,343.

*To all whom it may concern:*

Be it known that I, CHARLES E. DE MOSS, a citizen of the United States, residing at Indianapolis, in the county of Marion and State of Indiana, have invented certain new and useful Improvements in Tracking Devices for Slaughter-House Travelers, of which the following is a specification.

This invention relates to improvements in means for handling dressed meat in slaughter-houses, and has reference to devices for directing the travelers from which the dressed carcasses are suspended with certainty upon the tracks, by means of which said bodies are transported to the cooling-rooms or other portions of the slaughter-houses.

I accomplish the objects of the invention by the mechanism illustrated in the accompanying drawings, in which—

Figure 1 is a perspective view of a pair of tracks, showing a hoisting-tree with travelers suspended from each end of said tree in position upon the respective tracks preparatory to the release of said travelers from their hoisting means; and Fig. 2 is a side elevation of one of the travelers with its holding device in holding position with relation to said traveler and showing said parts upon the track just preparatory to the release of the traveler. This figure shows the holding device in dotted lines in position of release from said traveler.

Like characters of reference indicate like parts throughout the two views of the drawings.

The traveler comprises the circumferentially-grooved wheel 3, which is rotatably supported by the bar 4, and from the lower end of the bar 4 is the hook 5, from which the beef or other carcass is suspended.

6 represents a tree comprising a horizontal bar from near the ends of which extend two upward oblique bars which meet in a loop above and midway of the ends of said lower bar. To this loop a hook 7 on the lower end of a hoisting-rope 8 is attached. The hoisting-rope is operated by and from any suitable device, by means of which the tree 6 may be raised or lowered.

9 represents triangular metal plates which have perforations at their upper ends to receive a corresponding end of the lower bar of the tree 6, and the retention of this plate upon said tree is insured by the bending of the ends of the bar over to form hooks in the manner as clearly shown in the drawings. The fit of the ends of the tree in plates 9 will be close enough to prevent a too free lateral movement of the plate on said tree in order thereby to insure a proper position of the traveler and its load, which will be suspended from said plate.

As the construction of both of the holders for the two travelers for a tree are the same, a description of one will suffice for both. Pivoted to the opposite lower corners of the plate 9 are the links 10, and pivoted to the outer end of the links 10 are a pair of levers 11 and 12, which levers are pivotally united at 13 to form a tongs. These levers with the links 10 form a lazy-tongs construction which causes the lower jaws to close by the weight of any body suspended therefrom. The ends of the links 10 are slotted to receive the plate 9 and the ends of levers 11 and 12, respectively, the slotted construction being preferred, for the reason that the sides of the links will prevent lateral movement of the parts while permitting free vertical movement of same around the several pivots at the different joints. One of the jaws 11 of the tongs is slotted for the passage of the other jaw or lever 12 therethrough, thereby providing a more rigid construction of tongs.

14 is a latch-hook which is pivoted at its lower end to the jaw or lever 12 and extends into the slot of jaw or lever 11 and will engage a pin 15, which passes through said slot when the tongs is opened into the position shown by dotted lines in Fig. 2. The lower ends of jaws or levers 11 and 12 are curved to fit the grooved periphery of wheel 3 and securely retain the wheel until the jaws are spread to the position shown by dotted lines in Fig. 2. The jaws thus spread will be retained in this spread position by the engagement of the latch-hook 14 with the pin 15 in the manner as clearly shown in Fig. 2, whereupon the tongs by raising the tree 6 may be readily raised clear of the wheel and traveler.

17 represents tracks to receive the travelers and upon which the latter will run, and they and their load will be conveyed to any desired part of the slaughter-house. These tracks are suspended from suitable overhead supports by means of the bars 18 of usual construction.

In the operation of my device the lazy-tongs at each end of the tree 6 are provided with a traveler. The tree is lowered still farther, if necessary, and the hooks 5 of the travelers are properly inserted into the carcasses to be elevated, and thereupon the tree is elevated by the hoisting means heretofore referred to. The suspended weights will close the jaws of the tongs closely against the wheels of the travelers, so as to prevent the accidental removal of the latter. The tree is then elevated until the wheels of the travelers and the lazy-tongs holding them are above the tops of the rails 17. Then the traveler at the right-hand end of tree 6 is moved around the end of the right track 17, so the bar 4 of the traveler will be outside of said track and the wheel in position above the track. As the track is narrow and the groove in the wheel correspondingly narrow, much difficulty has been experienced heretofore in the placing of the wheel accurately upon the track; but I overcome this difficulty in my device by providing a pair of wings or flanges 19 and 20, which are oblique or spread laterally of each other and form guides to direct the placing of the wheels. Thus by raising the tongs holding a traveler above the track it is an easy matter guided by the flanges to locate the traveler, so that when the tongs are open the grooved wheels will be in exact position upon the track. After the traveler at the right-hand end of tree 6 has been located on its track the traveler at the other end of the tree will be swung into position over the left track and located by means of the flanges on its tongs in a manner similar to that described for the right-hand traveler, except that as the bar 4 is upon the inside of the traveler it affords no obstruction and permits the device to be moved over upon the rail without being inserted on the latter over the end of the rail, as described for the traveler at the right-hand end of the tree. The release of the travelers from their lazy-tongs is readily accomplished. By lowering the tree the action of its weight will be to spread the upper ends of the tongs, because the lower ends of the tongs will have a bearing upon the tops of rails 17 and cannot recede as the tree is lowered. This will cause the tongs to open until the latch-hook is caught over its pin, and when so caught the closing of the jaws will be prevented and then the tree and suspended lazy-tongs can be elevated until the tongs are clear of the travelers, and then by swinging the tree more into parallelism with the tracks that part of the device can be lowered for the attachment of a new set of hangers and for reloading, and the travelers just released are free to be moved along the tracks with their loads to the points desired in the slaughter-house.

Having thus fully described my invention, what I claim as new, and wish to secure by Letters Patent of the United States, is—

1. In a device for the purposes specified, a track, removable travelers mounted thereon, a tree, plates pivotally secured to the ends of the tree lazy-tongs supported by the plates and adapted to temporarily hold said travelers, means for raising and lowering the tree, and means on said lazy-tongs for directing the travelers into operative position upon their respective tracks.

2. In a device for the purposes specified, a tree, plates pivotally secured to the ends of the tree, tongs secured by links to said plates the lower ends of said tongs being curved inwardly toward each other, and provided with outwardly-diverging flanges in pairs for each jaw of the tongs, means for raising and lowering the tree, a track or tracks, and travelers having wheels to roll upon said tracks said wheels fitting the bent jaws of the tongs and adapted to be removably held by the latter.

3. In a device for the purposes specified, a track or tracks, travelers adapted to be placed thereon having grooved wheels to roll upon said tracks, a vertically-movable tree, lazy-tongs supported by the ends of said tree, the jaws of said tongs being adapted to open to receive and closed to hold the grooved wheels of the travelers, said lazy-tongs having diverging flanges in pairs, for the purpose of locating the grooved wheels upon said track, said tongs opening when pressed downwardly against said track, and means for automatically locking them in their open position.

4. In a device for the purposes specified, a tree, and lazy-tongs carried by said tree one of the jaws of said lazy-tongs having a hook to hook into a portion of the other jaw when the two are opened, to hold the tongs in open adjustment.

5. Means for placing travelers on tracks, comprising a tree, tongs suspended from the ends of the tree said tongs having pairs of diverging flanges as guides in placing the device on the track, means for opening and closing the tongs, and a lock for automatically locking the tongs in open position.

6. In a device for the purposes specified, tracks, removable travelers operating upon said tracks said travelers including a peripherally-grooved wheel, a tree, means for raising and lowering the tree, plates through which the ends of the tree are passed to secure the plates to the tree, tongs, links connecting the tongs with the plates, one jaw of said tongs being slotted for the passage of the other jaw therethrough the lower jaws of said tongs being curved to fit the grooved peripheries of the traveler-wheels the lower ends of said tongs having oppositely-divergent flanges for guides in placing the wheels of the travelers on their tracks, and a lock for holding the jaws of the tongues in their open positions.

In witness whereof I have hereunto set my hand and seal, at Indianapolis, Indiana, this 18th day of April, A. D. 1905.

CHARLES E. DE MOSS. [L. s.]

Witnesses:
J. A. MINTURN,
ELIHU F. BARKER.